United States Patent
Längle et al.

(10) Patent No.: US 11,982,413 B2
(45) Date of Patent: May 14, 2024

(54) LIGHTING DEVICE AND LIGHTING METHOD FOR AT LEAST ONE PLANT

(71) Applicant: FRAUNHOFER-GESELLSCHAFT ZUR FÖRDERUNG DER ANGEWANDTEN FORSCHUNG E. V., Munich (DE)

(72) Inventors: Thomas Längle, Karlsruhe (DE); Dirk Seiffer, Karlsruhe (DE); Andreas Reimann, Aachen (DE); Simon Vogel, Aachen (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 182 days.

(21) Appl. No.: 17/624,778

(22) PCT Filed: Jul. 3, 2020

(86) PCT No.: PCT/EP2020/068807
§ 371 (c)(1),
(2) Date: Jan. 4, 2022

(87) PCT Pub. No.: WO2021/004932
PCT Pub. Date: Jan. 14, 2021

(65) Prior Publication Data
US 2022/0299180 A1    Sep. 22, 2022

(30) Foreign Application Priority Data
Jul. 5, 2019   (DE) .................... 10 2019 209 916.5

(51) Int. Cl.
*F21S 19/00*       (2006.01)
*A01G 7/04*        (2006.01)
*F21Y 115/10*      (2016.01)

(52) U.S. Cl.
CPC ............ *F21S 19/005* (2013.01); *A01G 7/045* (2013.01); *F21Y 2115/10* (2016.08)

(58) Field of Classification Search
CPC ................................ F21S 19/005; A01G 7/045
See application file for complete search history.

(56) References Cited

U.S. PATENT DOCUMENTS

| 4,653,223 | A | 3/1987 | Mori |
| 5,716,442 | A | 2/1998 | Fertig |

(Continued)

FOREIGN PATENT DOCUMENTS

| CN | 109156225 A | 1/2019 |
| CN | 109315113 A | 2/2019 |

(Continued)

OTHER PUBLICATIONS

China National Intellectual Property Administration, First Office Action in Chinese Patent Application No. 202080056211.0 (dated Feb. 28, 2023).

(Continued)

*Primary Examiner* — Richard G Davis
(74) *Attorney, Agent, or Firm* — Leydig, Voit & Mayer, Ltd.

(57) ABSTRACT

The invention relates to a lighting device for at least one plant, comprising an artificial lighting unit for providing artificial light for lighting the plant; a sunlight unit for providing sunlight for lighting the plant; a mixing unit for generating a mixed light consisting of the artificial light and the sunlight; a distributing unit for distributing the mixed light and lighting the plant with the distributed mixed light; and an adjustment unit for adjusting a property of the mixed light. The invention provides a lighting device for at least one plant, i.e., one or more plants, wherein the device can be used in an energy-saving manner for indoor farming.

11 Claims, 1 Drawing Sheet

(56) References Cited

U.S. PATENT DOCUMENTS

| | | | | |
|---|---|---|---|---|
| 10,368,498 B1 * | 8/2019 | Chou | ..................... | G02B 6/003 |
| 2010/0076620 A1 | 3/2010 | Loebl et al. | | |
| 2013/0002144 A1 * | 1/2013 | Adler | ..................... | F21S 2/00 |
| | | | | 315/153 |
| 2013/0145688 A1 | 6/2013 | Tatsumi et al. | | |

FOREIGN PATENT DOCUMENTS

| | | |
|---|---|---|
| CN | 109386743 A | 2/2019 |
| DE | 202010012228 U1 | 11/2011 |
| EP | 2 680 671 A2 | 1/2014 |
| IT | RM20120111 A1 | 9/2013 |
| JP | 2011-216427 A | 10/2011 |
| JP | 2012-125204 A | 7/2012 |
| JP | 2018-014984 A | 2/2018 |
| KR | 20100136718 A | 12/2010 |
| KR | 2011-0016839 A | 2/2011 |
| KR | 101036598 B1 | 5/2011 |
| KR | 2011-0119430 A | 11/2011 |
| KR | 2012-0008773 A | 2/2012 |
| KR | 2012-0021050 A | 3/2012 |
| KR | 2013-0013003 A | 2/2013 |
| KR | 101299991 B1 | 8/2013 |
| KR | 2014-0080939 A | 7/2014 |
| WO | 2016/186238 A1 | 11/2016 |

OTHER PUBLICATIONS

Intellectual Property Office of Singapore, Invitation to Respond to Written Opinion and Search Report in Singapore Patent Application No. 11202114401Q (dated Jun. 6, 2023).
German Patent Office, first Examination Report in German Patent Application No. 10 2019 209 916.5 (dated Feb. 27, 2020).
German Patent Office, second Examination Report in German Patent Application No. 10 2019 209 916.5 (dated Aug. 4, 2020).
European Patent Office, International Search Report in International Application No. PCT/EP2020/068807 (dated Sep. 17, 2020).
European Patent Office, Written Opinion in International Application No. PCT/EP2020/068807 (dated Sep. 17, 2020).
International Bureau of WIPO, International Preliminary Report on Patentability in International Application No. PCT/EP2020/068807 (dated Jan. 11, 2022).
Saudi Authority for Intellectual Property, Substantive Examination Report in Saudi Patent Application No. 522431328 (dated Jun. 25, 2023).
China National Intellectual Property Administration, Second Office Action in Chinese Patent Application No. 202080056211.0 (Dec. 19, 2023).

* cited by examiner

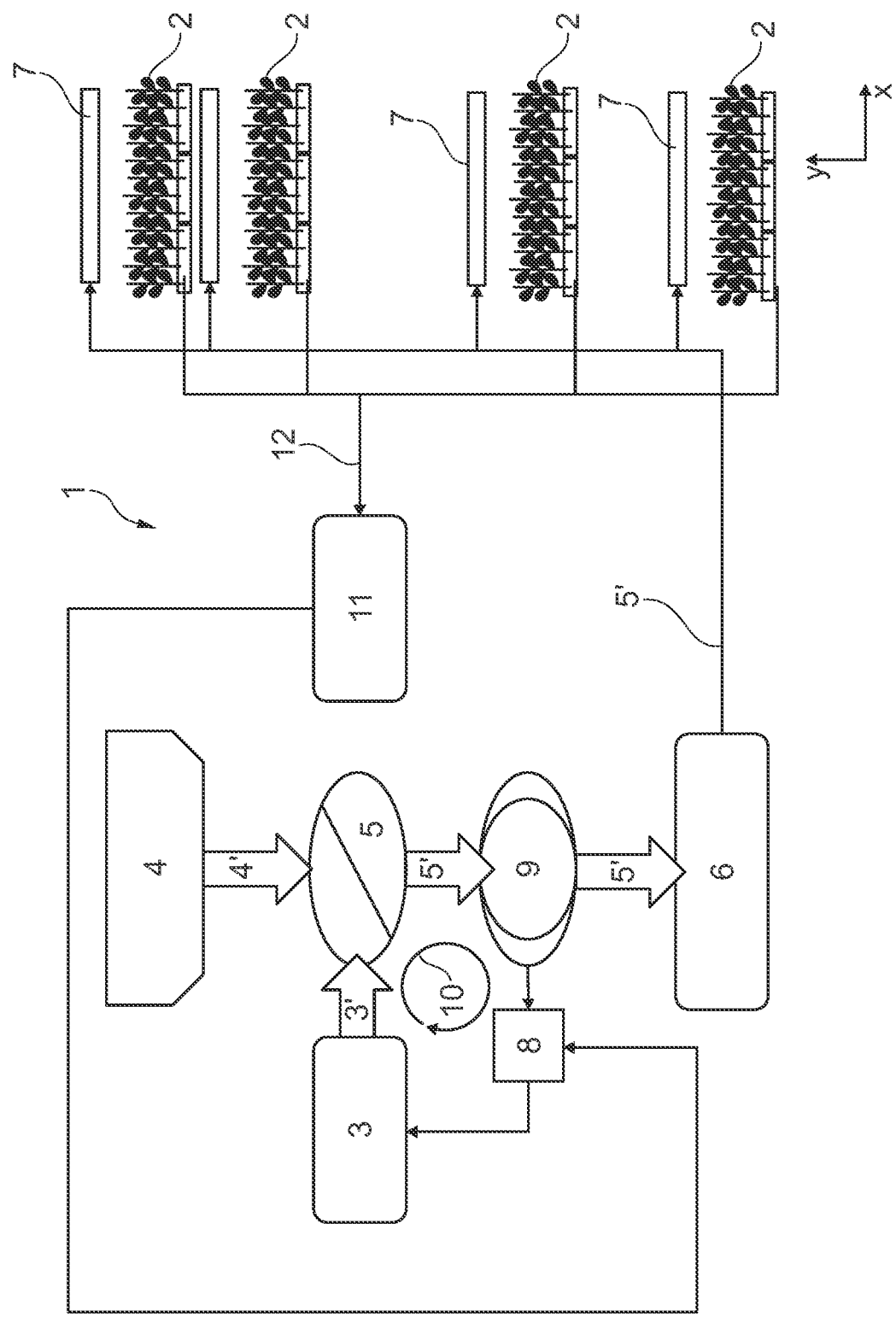

LIGHTING DEVICE AND LIGHTING METHOD FOR AT LEAST ONE PLANT

CROSS-REFERENCE TO RELATED APPLICATIONS

This patent application is the U.S. national phase of International Application No. PCT/EP2020/068807, filed on Jul. 3, 2020, which claims the benefit of German Patent Application No. 10 2019 209 916.5, filed Jul. 5, 2019, the disclosures of which are incorporated herein by reference in their entireties for all purposes.

The invention relates to a lighting device for at least one plant having an artificial light unit for providing artificial light for the lighting of the plant and having a sunlight unit for providing sunlight for the lighting of the plant. The invention also relates to a corresponding method.

By 2050 66% of the world's population will live in cities. That is more than 6 billion people, with an increasing trend. At the same time, 80% of global arable land is in agricultural use. The sustainable safeguarding of the urban food supply is increasingly becoming a challenge—in particular in densely populated cities with limited access to surrounding agricultural regions that will in future face the conflicting goals of development areas—with limited resources. Intensive cultivation practices, the massive use of chemicals, and the increasingly more unfavorable climatic conditions are furthermore a huge problem for future food production.

Against this background, work is being carried out around the world on innovative cultivation methods and technologies that address these problems and focus on an integration of food production into the urban structure. A particularly promising approach here is vertical farming in a closed system while excluding abiotic environmental factors such as precipitation or temperature. Despite the decisive advantage of maximum yield by acre under indoor conditions that can be reproduced in a controlled manner, the high energy expenditure and total operating costs currently in particular prevent an extensive application of the technology. The plant lighting represents the greatest cost driver here with a contribution to energy costs of up to 80%.

The object is accordingly set of providing a lighting device for at least one plant, that is for one or more plants, that can be used in an energy-saving manner in indoor farming.

This object is achieved by the independent claims. Advantageous embodiments result from the dependent claims, from the description, and from the FIGURE.

An aspect relates to a lighting device for at least one plant, that is one or more plants, having an artificial light unit for providing artificial light for the lighting of the plant(s) and having a sunlight unit for providing sunlight for the lighting of the plant(s). The artificial light unit can here be an adjustable artificial light unit whose spectral distribution and/or whose intensity of the provided or generated artificial light can be set and can, for example, have light emitting diodes (LEDs) as the artificial light sources. The sunlight unit can comprise a sunlight collector or the like, for example.

The lighting device also comprises a mixing unit for generating mixed light from the artificial light and the sunlight, as well as a distribution unit for distributing the mixed light and lighting the plant(s) with the distributed mixed light, and a setting or regulating unit for the automatic setting (or regulating) of a property of the mixed light. The setting in the sense of the invention can therefore comprise or be a regulation or control. The setting can in particular be a dynamic setting so that the property of the mixed light can be flexibly adapted to changing conditions such as will be listed further below. The setting can in particular comprise a setting of at least one property of the artificial light and/or a setting of a property of the sunlight. The setting of the artificial light can, for example, be effected by a setting, that is a controlling or regulating, of the artificial light unit, for example by dimming. The setting of the sunlight can, for example, be achieved by the setting, that is controlling or regulating, of a filter unit such as is described further below. The sunlight that is mixed with the artificial light in the mixing unit can therefore also be filtered and thus modified sunlight.

This has the advantage that a specific use, in particular a wavelength specific and/or intensity specific use, of sunlight is made possible under controlled conditions in a closed space. The sunlight can thus be supplemented by the artificial lighting for a specific plant light mixture or properties that are unfavorable for plant growth can also be filtered out of the sunlight. The plant light mixture, that is the mixture of the light, by which the plant is illuminated, can therefore be adapted to the respective needs of the plant and can thus improve growth. As described further below, this can also take place on a sensor basis, which enables a particularly advantageous dynamic optimization of the mixed light at the plant. Not only significant costs are saved in the energy area through the supplementary artificial lighting, but also by the optimized control of the illuminants in the artificial light unit, that are light emitting diodes operated up to their performance limits in customary systems, whose service life is extended. This also results in reduced waste generation and thus saves resources. Since the described lighting device does not make any further demands on indoor farming, it can be used in the entire field of indoor farming and can thus enable competitive regional food production.

The described lighting device thus overcomes the disadvantages of the building envelope that is customary to date in indoor farming and is impermeable to sunlight with exclusive operation of energy-intensive artificial light. The described composition also enables the regulation of the lighting device in a closed feedback loop that can comprise, for example, as described further below, a sunlight collection and sunlight forwarding, an optical filtering of the sunlight, a mixing of sunlight and artificial light, a sensor-based regulation of the properties of the mixed light with light mixtures favorable for plant growth, and the homogeneous distribution of the mixed light. Optimized conditions for plant growth can thus be provided in every growth phase by the mixture of sunlight and artificial light, with energy consumption additionally being minimized.

Provision is made in an advantageous embodiment here that the settable (in particular controllable/regulable) property comprises a spectral distribution and/or an intensity. This has the advantage that the mixed light can be adapted particularly simply and inexpensively to the biological conditions.

Provision is made in another advantageous embodiment that the setting unit is configured to set a property of the mixed light dynamically, in particular by a setting of the property of the sunlight and/or of a property of the artificial light. This has the advantage of a flexible adaptation of the lighting to conditions that vary over the course of the day, for example, and that can be caused both by a growth cycle of the plant and by an astronomical cycle, or by a meteorological influence.

Provision is made in a particularly advantageous embodiment that the setting unit is configured to set the property of the mixed light in accordance with a stored specification. Such a stored specification can, for example, also be called a specified mixed light composition and in particular comprises a specified spectral distribution and/or a specified intensity of the light. The stored specification or composition can able be understood as or called a (stored) desire value specification. The stored specification can also comprise a time change of the mixed light, for example in the form of functions that comprises a time sequence of an intensity and/or spectral distribution that the mixed light should have. Growth phases in plants can, thus, for example, be taken into account in the lighting or also generally preferences of the plant kind or plant type to be illuminated by the lighting device, which in turn brings about improved plant growth or an increased efficiency of the lighting with a minimized energy consumption.

Provision can be made here that the specification depends on a measured variable, in particular on a time and/or a season and/or on a temperature and/or on humidity and/or on soil moisture and/or on a nutrient concentration and/or on a plant variety and/or plant species and/or on plant ingredients to be induced and/or on a date. A particularly exact adaptation of the lighting can thus take place.

Provision is made in a further particularly advantageous embodiment that the lighting device also has a sensor unit for detecting a spectral distribution and/or an intensity of the sunlight and/or of the mixed light and/or of the artificial light. The setting unit is configured here to set or to regulate the property of the mixed light in dependence on the detected spectral distribution and/or on the detected intensity. Which spectral components have to be amplified and what spectral components have to be damped can be determined in a particularly advantageous manner here by a comparison of the detected spectral distribution and/or intensity with the stored specification, that is the specified mixed light composition. The dynamic setting or modulation of the sunlight, for example by filtering by means of the filter unit described further below and/or the possibly required enrichment by the artificial light, correspondingly required for generating an optimum lighting spectrum can here be calculated by a corresponding optimization process. Since spectral distribution and/or intensity can be detected efficiently and inexpensively by commercial spectral sensors, the spectral analysis of the variable sunlight or of the other lights can also take place efficiently and inexpensively.

In a further advantageous embodiment, a filter unit that is settable by the setting unit can accordingly also be provided for an optical filtering of the sunlight and/or of the mixed light and/or of the artificial light. The optical filtering of the sunlight and/or of the mixed light is particularly advantageous here since its/their spectral components cannot be generated as desired, in contrast to artificial light. Unwanted components of the light that possibly impair plant growth can thus also be reduced in a simple manner and thus the efficiency of the lighting can be improved overall.

Provision is made in another advantageous embodiment that the distribution unit comprises a plurality of illumination units over which the mixed light is homogeneously distributed and that then irradiate the mixed light onto the plant(s). The illumination units are here arranged above one another, in particular on an intended use, that is, for example, viewed in a gravitational field of the earth. Particularly with this arrangement above one another, the vertical arrangement, a lot of space can namely be saved, on the one hand; on the other hand, shadowing effects in the customary lighting units are very restrictive so that the light arriving at the plants is here typically particularly non-uniform. The advantage of a homogeneous lighting, that effects a uniform growth of the different plants or plant parts, is therefore amplified here.

A further aspect also relates to a plant cultivation system having a lighting device in accordance with one or more of the described embodiments and having one or more of the following devices: A temperature adjustment device for setting a temperature for a plant/plants that can be illuminated by the lighting device; a humidifier for setting a humidity for the plant(s) that can be illuminated by the lighting device; a soil moistening device for setting a soil moisture for the plant(s) that can be illuminated by the lighting device; a fertilization device for setting a nutrient concentration for the plant(s) that can be illuminated by the lighting device. This has the advantage that the plant growth is improved and the efficiency of the lighting is further increased by the lighting device via a centralized or independent, also interdependent, control of the different control devices.

An additional aspect also relates to a method of lighting at least one plant comprising the method steps of providing an artificial light for the lighting of the plant; of providing sunlight for the lighting of the plant; of generating mixed light from the artificial light and the sunlight; the setting of a property of the mixed light; and the distribution of the mixed light and the lighting of the plant with the distributed mixed light.

Advantages and advantageous embodiments of the method here correspond to advantages and advantageous embodiments of the lighting device or of the plant cultivation system.

The feature combinations named above in the description as well as the features and feature combinations named in the following in the description of the FIGURE and/or shown in the FIGURE alone cannot only be used in the respective indicated combination, but also in other combinations without departing from the framework of the invention. Embodiments are thus also to be considered as covered and disclosed by the invention that are not explicitly shown and explained in the FIGURE, but can be seen from and generated by the explained embodiments by separate feature combinations. Embodiments and feature combinations are also to be considered disclosed that thus do not have all the features of an originally formulated independent or dependent claims. Embodiments and feature combinations, in particular from the above-shown embodiments, are furthermore to be considered disclosed that go beyond the feature combinations presented in the dependences of the claims or differ therefrom.

BRIEF DESCRIPTION OF THE DRAWINGS

Embodiments of the invention will be explained in more detail in the following with respect to a schematic drawing.

The FIGURE shows an exemplary embodiment of a lighting device for at least one plant.

DETAILED DESCRIPTION OF THE INVENTION

The lighting device 1 shown in the present case serves the lighting of a plurality of plants 2 and comprises an artificial light unit 3 for providing artificial light 3' and a sunlight unit 4 for providing sunlight 4' which both serve the lighting of the plant 2. The lighting device 1 furthermore also has a mixing unit 5 for generating mixed light 5' from the artificial light 3' and the sunlight 4' as well as a distribution unit 6 for distributing the mixed light 5' and lighting the plants 2 with the distributed mixed light 5'. In the present case, the distribution unit 6 also has a plurality of illuminating units 7 by which the mixed light is homogeneously distributed. The illuminating units 7 are in the present case arranged above one another here, i.e. above one another in the y direction and respectively (in the y direction) above the plants 2 to be illuminated.

The lighting device 1 also has a setting unit 8 for setting a property of the mixed light 5'. This is done indirectly in the present case in that the setting unit 8 indirectly sets the artificial light unit 3 and thus, via the artificial light 3' (directly settable here), a property such as a spectral distribution and/or an intensity of the mixed light 5'. Since the lighting unit 1 also has a sensor unit 9 in the present case for detecting a spectral distribution and/or an intensity in the present case of the mixed light and the setting unit 8 is configured to set the property of the mixed light in dependence on the detected spectral distribution or intensity of the mixed light, that is in the present case to control the artificial light unit 3 in dependence on the detected spectral distribution or intensity, a closed feedback loop symbolized by the annular arrow 10 is implemented in the example shown. This feedback loop can, for example, also be expanded by a corresponding filter unit for the optical filtering of one of the lights 3', 4', 5', whereby then not only a complementing or supplementing of the sunlight 4' can be implemented by the artificial light 3', but also a damping of certain spectral components of the sunlight 4' and thus also of the mixed light 5'.

In the example shown, the setting unit 8 is also configured to set the property of the mixed light in accordance with a stored specification 11. The stored specification 11 is in the present case adapted to the type of the plants 2 in the present case and can here depend on a measured variable 12, a soil moisture in the present case.

What is claimed is:

1. A lighting device for at least one plant comprising an artificial light unit for providing artificial light for lighting the plant and a sunlight unit for providing sunlight for lighting the plant; the device further including:
    a mixing unit for generating mixed light from the artificial light and the sunlight;
    a distribution unit for distributing the mixed light and lighting the plant with the distributed mixed light; and
    a setting unit for setting a settable property of the mixed light in accordance with a stored specification, wherein the stored specification comprises a time sequence of a spectral distribution that the mixed light should have.

2. The lighting device in accordance with claim 1, wherein the settable property comprises a spectral distribution and/or an intensity.

3. The lighting device in accordance with claim 1, wherein the setting unit is configured to dynamically set the settable property of the mixed light.

4. The lighting device in accordance with claim 1, wherein the stored specification comprises a time sequence of an intensity that the mixed light should have.

5. The lighting device in accordance with claim 4, wherein the stored specification depends on a measured variable.

6. The lighting device in accordance with claim 5, wherein the measured variable is a time and/or a season and/or a temperature and/or a humidity and/or a soil moisture and/or a nutrient concentration.

7. The lighting device in accordance with claim 1, which includes a sensor unit for detecting a spectral distribution and/or an intensity of the sunlight and/or of the mixed light and/or of the artificial light; wherein the setting unit is configured to set the settable property of the mixed light in dependence on the detected spectral distribution and/or on the detected intensity.

8. The lighting device in accordance with claim 1, which includes a filter unit settable by the setting unit for the optical filtering of the sunlight and/or of the mixed light and/or of the artificial light.

9. The lighting device in accordance with claim 1, wherein the distribution unit comprises a plurality of illuminating units over which the mixed light is homogeneously distributed.

10. A plant cultivation system having a lighting device in accordance with claim 1 and having one or more of the following devices:
    a temperature control device for setting a temperature for the plant that can be illuminated by the lighting device;
    a humidifier for setting a humidity for the plant that can be illuminated by the lighting device;
    a soil moisturizing device for setting a soil moisture for the plant that can be illuminated by the lighting device;
    a fertilization device for setting a nutrient concentration for the plant that can be illuminated by the lighting device.

11. A method of lighting at least one plant comprising:
    providing artificial light for the lighting of the plant;
    providing sunlight for lighting the plant;
    generating mixed light from the artificial light and the sunlight;
    setting a property of the mixed light in accordance with a stored specification, wherein the stored specification comprises a time sequence of a spectral distribution that the mixed light (5') should have; and
    distributing the mixed light and lighting the plant with the distributed mixed light.

* * * * *